United States Patent [19]

Rayburn

[11] 3,758,833
[45] Sept. 11, 1973

[54] WOUND FILM CAPACITOR
[75] Inventor: Charles Calvin Rayburn, Glenview, Ill.
[73] Assignee: Illinois Tool Works Inc., Chicago, Ill.
[22] Filed: Feb. 21, 1973
[21] Appl. No.: 334,348

[52] U.S. Cl................................ 317/258, 317/260
[51] Int. Cl................................................ H01g 1/14
[58] Field of Search........................... 317/258, 268

[56] References Cited
UNITED STATES PATENTS
3,638,086  1/1972  Rayburn........................... 317/260

Primary Examiner—E. A. Goldberg
Attorney—Robert W. Beart et al.

[57] ABSTRACT

A film capacitor wound about its lead wires so that at least three layers of dielectric material are sandwiched between two layers of electrodes with transverse portions of the electrodes and three layers of dielectric being positioned between axial portions of two lead wires. One of the dielectric layers being a short relatively thick thermoplastic material and which, upon being heated, shrinks to lock the leads in firm engagement with the electrode layers. The relatively thick dielectric insert also providing protection against shorts at the center of the capacitor.

6 Claims, 6 Drawing Figures

PATENTED SEP 11 1973 3,758,833
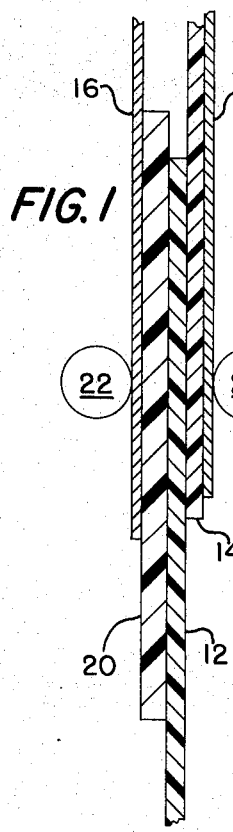
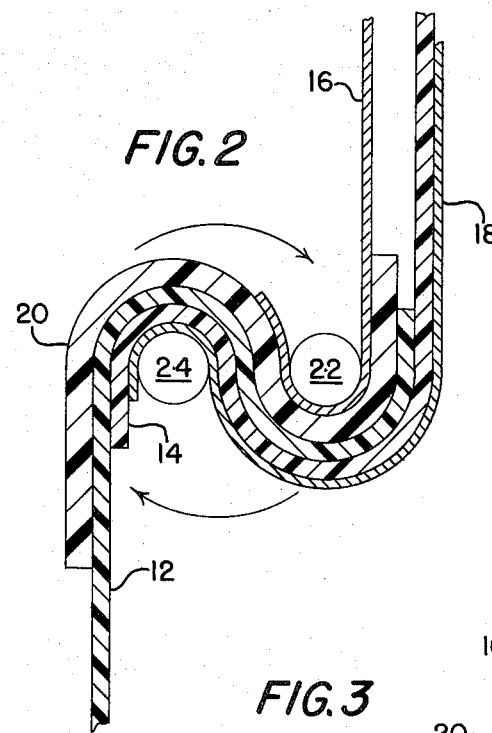
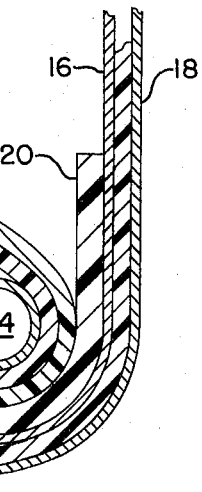
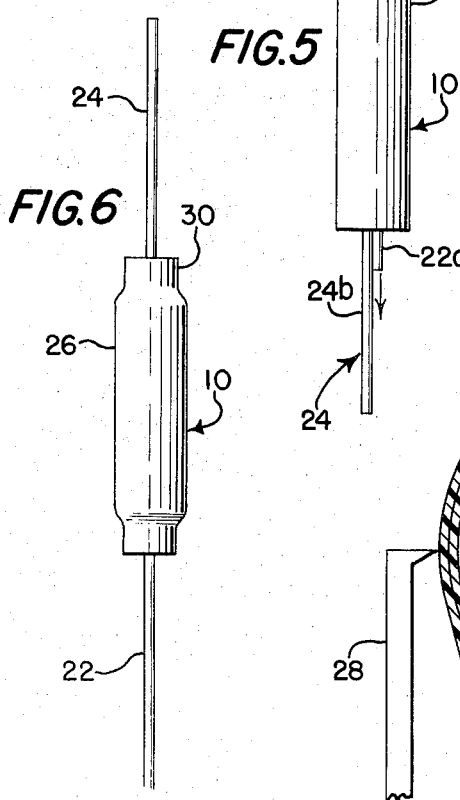
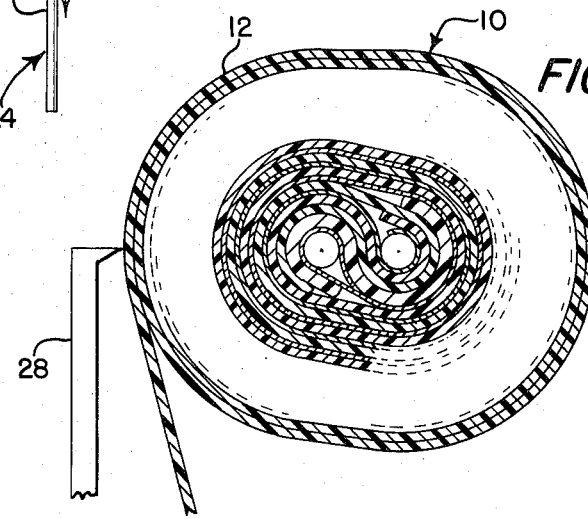

WOUND FILM CAPACITOR

BACKGROUND OF THE INVENTION

Wound film capacitors utilizing a plurality of alternating tightly wound layers of electrode and plastic film material as a dielectric are commonly used. However, efficient application of leads to such capacitors has been somewhat of a problem. Prior art lead attachments have centered around the securement of leads to the ends of the capacitors by soldering or the like. Another manner of providing leads to wound capacitors is the placement of terminal tabs within the winding of the capacitor. This procedure normally requires anchoring of the leads to the electrodes in some manner. More recently, attempts have been made to wind a capacitor about its lead wires. Examples of such techniques are shown in U. S. Pat. Nos. 3,229,174 and 3,638,086. In techniques utilizing the lead wires as the winding mandrels, such as the above mentioned U. S. patents, it is important to provide structure or means for securing or locking the leads to the electrodes while at the same time insuring against shorting between the lead wires since they will normally be in close proximity to each other at the center of the capacitor.

The capacitor described in U. S. Pat. No. 3,638,086 relies primarily on the heat shrinkage of the dielectric around a deformed axial extent of each of the lead wires to prevent relative rotation or axial movement between the leads.

SUMMARY OF THE INVENTION

The present invention provides a wound film capacitor which is constructed by winding several layers of electrode and dielectric material about a pair of lead wires. The use of the lead wires as the winding mandrels thus serves to minimize the size of such a wound film capacitor. In a manner similar to the technique of winding a capacitor on smooth portions of the lead wires and thereafter moving such lead wires axially of the capacitor body to provide deformed portions about which the capacitor can be locked, the present invention locks the leads in position through the use of a short, relatively thick thermoplastic insert whose primary function is to provide a mechanical lock through the use of its heat shrinking characteristics. The use of such an insert will, thus, enable the other layers of dielectric to be as thin as possible or to exhibit other desirable electrical properties without regard for their capabilities of providing firm, mechanical locks to the capacitor.

The improved capacitor constructed in accordance with the present invention thus is extremely versatile in that a number of film combinations can be used to achieve special electrical characteristics. In addition, in a film-foil type of a capacitor, either aluminum or tin can be used in combination with one or more of such films as polyester, polypropylene, polystyrene, polycarbonate or combinations thereof.

Since the improved capacitor utilizes at least three thicknesses of dielectric between the electrode foil and lead wires, this critical area of the capacitor can, thus, tolerate higher temperatures, such as those encountered during lead soldering. In addition, the tendencies of leads which are moved relative to the capacitor body to effect locking to tear the relatively thin dielectric and thus cause shorting, is minimized due to the presence of the thermoplastic insert.

It is, accordingly, an object of the invention to provide a capacitor which is wound about its lead wires which is capable of a wide range of electrical characteristics.

Another object of the invention is to provide a capacitor which is wound about its leads, thus eliminating a discrete mandrel, and which utilizes a layer of thermoplastic material of a relatively short length and utilizing its heat shrinking characteristics to lock the leads against relative movement within the capacitor while allowing the wound film serving as the dielectric to be chosen primarily for electrical characteristics.

Still a further object of the present invention is the provision of a wound film capacitor capable of using extremely thin dielectric strips which have the capability of locking deformed portions of lead wires upon the application of heat through the use of a relatively thick thermoplastic insert situated between the lead wires and at least partially wrapped therearound.

These and other objects and advantages are achieved by the present invention in which at least three thicknesses or layers of dielectric material are positioned between a pair of electrode layers and a pair of lead wires. The one thickness of dielectric being of a relatively short length and relatively thick cross section to provide the mechanical locking of the lead wires within the capacitor while allowing the dielectric film to be as thin as possible.

BRIEF DESCRIPTION OF THE DRAWINGS

FIGS. 1, 2 and 3 are end cross-sectional views showing, respectively, the positions of the various foil and dielectric layers (enlarged for clarity) of the capacitor relative to each other and the lead wires: prior to winding; after one-half revolution and after one full revolution of winding.

FIG. 4 is a diagrammatic end view of the capacitor section illustrating the sealing and cutting off of the outer dielectric layer and illustrating the longitudinal extent of the plastic insert.

FIG. 5 is a top plan view of the capacitor immediately after a winding operation.

FIG. 6 is a top plan view similar to FIG. 5 showing the capacitor after the lead wires have been repositioned and the dielectric heat shrunk around them.

DESCRIPTION OF THE PREFERRED EMBODIMENT

With reference to the accompanying drawings, the initial winding step in the formation of capacitor 10 comprises placing a pair of thermoplastic dielectric film strips 12 and 14 in sandwiched relationship between a pair of foil strips 16 and 18. A relatively short, thick thermoplastic insert 20 is also placed between the electrode strips 16 and 18. The electrode strips may have widths of varying amounts less than the width of the termoplastic dielectric strips 12 and 14. A pair of elongated lead wire members 22 and 24 are placed on opposite sides of the layers of material 16, 20, 12, 14 and 18 and mounted in a winding head (not shown) which will rotate them about a common center so as to wind the layers in the manner shown in FIGS. 2 and 3. FIG. 2 shows the location of the various layers after the assembly has been rotated approximately one-half a revolution. FIG. 3 shows the relative position of the layers after the assembly has been rotated one full revolution.

The winding of the capacitor in the manner shown may be continued until the desired lengths of foils 16 and 18 have been wound in and thereafter one of the dielectric strips 12 may be extended to provide an outer wrap. This outer wrap may be sealed by utilizing a combination heat sealing and cutting bar 28 in the manner described pictorially in FIG. 4.

At the completion of the winding and sealing, the capacitor will appear as shown in FIG. 5 with FIG. 4 being a representative cross section of such a capacitor. Attention is directed to FIGS. 3 and 4 wherein the relatively thick dielectric insert 20 is shown to include a transverse portion extending between the lead wires 22 and 24 and including a length sufficient to be wrapped around at least 270° of the periphery of each lead wire. The purpose of this to be set forth later herein.

After the winding procedure, the capacitor lead portions 22b and 24b may be deformed to provide a noncircular cross section in a manner similar to that taught in U. S. Pat. No. 3,638,086. Portion 22a and 24a may be pulled axially relative to one another in the directions of the arrows in FIG. 5, to bring the deformed portions within the capacitor body 26. The capacitor body 26 is then subjected to heat for a limited period of time, preferably based on the time and temperature necessary to shrink insert 20 to effect locking of the leads within the body 26. The shrinking also serves to exclude air from between the layers and to bring the foil layers 16 and 18 into firm electrical contact with the lead wires. FIG. 6 shows the capacitor body 26 after it has been subjected to the heat sufficient enough to shrink the layer 20. Portions 30 of the capacitor body are shown to be of reduced diameter, indicating that the width of the thermoplastic dielectric material is somewhat greater than the width of the electrode material.

It should be apparent that when the technique of sliding the lead wire relative to the body after the body has been wound thereabout is used the presence of the relatively thick insert 20 serves to eliminate the possibility of deformed portions of the lead wires from tearing through the foil and thin dielectric, producing shorts in this critical area. The thermoplastic insert 20 thus provides functions relating to the mechanical locking functions of the wound capacitor and reduces the burden of providing such functions through the dielectric film materials 12 and 14. Thus, the design of a capacitor need not be compromised to include structural capabilities in the dielectric material of the capacitor. Layers 12 and 14 could thus be as thin as possible in order to maximize the capacitance per unit volume.

Typically the insert 20 may be made of polypropylene in a thickness range of 1 to 4 mils. Its width may be wider than the foil electrodes but not necessarily wider than the dielectric film. Its length may be as little as needed to essentially surround both lead wires and is preferably long enough to be wrapped around at least 270° of the periphery of each lead to allow the heat shrinking characteristics of the insert to firmly lock the leads within the capacitor body.

Since the thick insert 20 is particularly designed to efficiently lock the leads within the capacitor and to protect the capacitor against shorting, a wide variety of materials can be used as the dielectric. For example, polycarbonate film and polyester film which can be provided in relatively thin strips, can be used in addition to polypropylene, polystyrene, or other available film materials. Tin foil has previously been preferred in capacitors which utilize heat shrinking of dielectrics to effect locking, since the tin foil responds more readily to pressures of the heat shrinking. However, since the heat shrinking capabilities of such a locking feature can now be maximized through the use of an insert 20, aluminum foil can now be used.

Thus it is apparent that there has now been provided, in accordance with the invention, a film capacitor which is would about its leads of such a construction that the locking and protection against shorting is provided by a thermoplastic insert while the dielectric film strips may be selected entirely for their electrical characteristics, While the invention has been described in conjunction with specific embodiments thereof, it is evident that many alternatives, modifications and variations will be apparent to those skilled in the art in light of the foregoing description. Accordingly, it is intended to embarce all such alternatives, modifications and variations as fall within the spirit and broad scope of the appended claims.

I claim:

1. A wound capacitor including a plurality of alternating layers of electrode strips and dielectric strips wound about a pair of lead wires, each lead wire contacting a substantial transverse portion of two different electrode strips, axial portions of the lead wires being spaced at the center of the capacitor by layers of the two electrode strips and at least three layers of dielectric material, the electrode strips being separated at the center of the capacitor by the three layers of dielectric material, one of said dielectric layers being a transverse portion of a strip of heat shrinkable thermoplastic material of a length less than the length of the other two dielectric strips.

2. The capacitor of claim 1, wherein the relatively short length of thermoplastic material is thicker than the other two dielectric layers.

3. The capacitor of claim 1, wherein the longer strips of dielectric are polyester film.

4. The capacitor of claim 1, wherein the longer strips of dielectric are polycarbonate film.

5. A wound capacitor in accordance with claim 1, wherein the shorter strip of dielectric includes a longitudinal portion wrapped around at least 270° of the periphery of each lead wire to firmly lock the leads within the capacitor body when the dielectric is subjected to heat.

6. The capacitor of claim 1, wherein a portion of the axial extent of each lead wire extending transversely of the electrode strips is noncircular in cross section to lock the leads within the capacitor body when the short heat shrinkable dielectric strip is subjected to heat.

* * * * *